(12) United States Patent
Kojima

(10) Patent No.: US 7,923,971 B2
(45) Date of Patent: Apr. 12, 2011

(54) NON-CONTACT ELECTRIC POWER TRANSMISSION APPARATUS

(75) Inventor: Hideki Kojima, Tsurugashima (JP)

(73) Assignee: Toko, Inc., Tokyo-To (JP)

( * ) Notice: Subject to any disclaimer, the term of this patent is extended or adjusted under 35 U.S.C. 154(b) by 455 days.

(21) Appl. No.: 12/218,092

(22) Filed: Jul. 11, 2008

(65) Prior Publication Data
US 2009/0015210 A1    Jan. 15, 2009

(30) Foreign Application Priority Data
Jul. 13, 2007  (JP) .................................. 2007-183806

(51) Int. Cl.
*H02J 7/06* (2006.01)
*G08B 21/00* (2006.01)
*B23K 11/24* (2006.01)
*H01H 47/00* (2006.01)

(52) U.S. Cl. ........ 320/163; 320/108; 320/155; 320/160; 340/3.31; 340/636.1; 340/636.12; 340/644; 307/112; 361/139

(58) Field of Classification Search .................... 320/163
See application file for complete search history.

(56) References Cited

U.S. PATENT DOCUMENTS

| | | | | |
|---|---|---|---|---|
| 5,698,963 A | * | 12/1997 | Seong et al. .................. | 320/145 |
| 6,028,413 A | * | 2/2000 | Brockmann .................. | 320/108 |
| 6,295,002 B1 | * | 9/2001 | Fukuda ....................... | 340/636.1 |
| 6,323,775 B1 | * | 11/2001 | Hansson ...................... | 340/636.1 |
| 2005/0162125 A1 | * | 7/2005 | Yu et al. ....................... | 320/108 |

FOREIGN PATENT DOCUMENTS

| JP | 06-311658 | 11/1994 |
|---|---|---|
| JP | 2000-037047 | 2/2000 |

* cited by examiner

*Primary Examiner* — Edward Tso
*Assistant Examiner* — Yalkew Fantu
(74) *Attorney, Agent, or Firm* — Renner, Kenner, Greive, Bobak, Taylor & Weber

(57) ABSTRACT

The object is to provide a safe non-contact electric power transmission apparatus reducing unnecessarily consumed electric power, while intermittently-operated or otherwise restrained electric power transmission is not performed, and heat is not generated when a metal such as a foreign object is placed. In a non-contact electric power transmission apparatus having: a power supplying unit 10 main body containing a power supplying coil L1 for non-contact electric power transmission; a power receiving unit 50 containing a power receiving coil L50 for non-contact electric power transmission; and a supporting base 20 for detachably mounting the power receiving unit 50, formed in a portion of the power supplying unit 10 main body, electric power being transmitted from the power supplying coil L1 to the power receiving coil L50 in a non-contact manner using electromagnetic induction, the power receiving unit 50 has a modulation circuit 52 which outputs a recognition signal upon receiving electric power from the power supplying coil L1 at the power receiving coil L50, and the power supplying unit 10 has a electric power transmitting circuit 1, a control circuit 2, detecting means 3, a demodulation circuit 4, a recognition circuit 5, and a timer circuit 6.

5 Claims, 4 Drawing Sheets

NON-CONTACT ELECTRIC POWER TRANSMISSION APPARATUS

BACKGROUND OF THE INVENTION

1. Field of the Invention

The present invention relates to a non-contact electric power transmission apparatus, and particularly relates to a non-contact electric power transmission apparatus for charging a secondary cell contained in an electronic device, such as a portable device, with a power receiving unit in a non-contact manner.

2. Related Art

In FIG. 7, there are shown in a non-contact electric power transmission apparatus a power supplying unit main body 10 containing a power supplying coil L1 for supplying power and a power receiving unit 50 containing a power receiving coil L50 for receiving power.

The power supplying unit main body 10 has a supporting base 20 for detachably mounting the power receiving unit 50. It is undesirable from the viewpoint of safety if the power supplying unit 10 starts electric power transmission without recognizing that the power receiving unit 50 is mounted in a predetermined position in the supporting base 20.

For example, if a metal piece x such as a coin is near and above the power supplying coil L1 as shown in FIG. 7, continuous electric power transmission heats the metal piece according to the principle of electromagnetic induction, which is dangerous.

In Japanese Patent Laid-Open No. 2000-37047, in order to avoid such heat generation by the metal piece x, the shape of the supporting base of the power supplying unit for placing the power receiving unit, which is a portable device, is elaborated so that the power receiving unit is mounted obliquely. Here, the power supplying coil is arranged in an inclined portion of the supporting base, and the power receiving coil is located on the rear side of the power receiving unit so as to face the power supplying coil. The occurrence of heat generation accidents has been avoided by thus mounting the power receiving unit obliquely.

However, there is a problem that the presence of the metal piece x causes the power supplying coil to displace from the power receiving coil, and the efficiency of the charging is lowered as well as the charging time becomes longer. There is also a problem that the additional design constraints of the power supplying unit make the designing difficult.

Japanese Patent Laid-Open No. 6-311658 discloses a method in which a power receiving coil, which is a power receiving unit, receives electric power by means of intermittently-operated or otherwise restrained electric power transmission from the power supplying side, thereby a recognition signal is sent back to the power supplying unit to be recognized by a recognition circuit, and if it matches, power transmission of regular charging power is started to charge a secondary cell or the like in the power receiving unit.

In this case, heat is not generated when a foreign object (such as a metal) is located since intermittently-operated or otherwise restrained electric power transmission is always performed. However, it is not desirable to always generate electric power uselessly even though it is intermittently-operated or otherwise restrained electric power. In addition, unnecessary electromagnetic waves are radiated in air as long as electric power is transmitted, which is undesirable.

SUMMARY OF THE INVENTION

Thus, in Japanese Patent Laid-Open No. 2000-37047, the power receiving unit is only mounted obliquely and it is dangerous because a metal piece is also heated if the metal piece adheres near the power supplying coil. In Japanese Patent Laid-Open No. 6-311658, although heat is not generated when a metal such as a foreign object is located since intermittently-operated or otherwise restrained electric power transmission is always performed, it is not desirable that, though it is intermittently-operated or otherwise restrained electric power, energy is uselessly consumed, and unnecessary electromagnetic waves are radiated in air.

The present invention has been made in order to solve the above problems, and its object is to provide a safe non-contact electric power transmission apparatus reducing unnecessarily consumed electric power, while intermittently-operated or otherwise restrained electric power transmission is not performed, and heat is not generated when a metal such as a foreign object is placed.

The non-contact electric power transmission apparatus of the present invention is a non-contact electric power transmission apparatus having: a power supplying unit main body containing a power supplying coil for non-contact electric power transmission; a power receiving unit containing a power receiving coil for non-contact electric power transmission; and a supporting base for detachably mounting the power receiving unit, formed in a portion of the power supplying unit main body, the apparatus transmitting electric power from the power supplying coil to the power receiving coil in a non-contact manner using electromagnetic induction, wherein: the power receiving unit has a modulation circuit which outputs a recognition signal upon receiving electric power from the power supplying coil at the power receiving coil;

the power supplying unit has detecting means, a demodulation circuit, a recognition circuit, and a timer circuit; the detecting means detects that the power receiving unit is placed on the supporting base to start transmission of electric power from the power supplying coil by means of control circuits, the recognition signal from the modulation circuit being detected as voltage change in the power supplying coil; the recognition signal is demodulated by the demodulation circuit to check whether or not the signal is a predetermined recognition signal; and a timer circuit is provided which, if the signal is not the predetermined recognition signal, stops the transmission of electric power for a predetermined time period and thereafter restarts it by checking again.

The modulation circuit of the power receiving unit generates a recognition signal upon receiving electric power from the power supplying coil at the power receiving coil, modulates the recognition signal, and outputs the recognition signal from the power receiving coil to the power supplying coil. Further, the recognition signal of the power supplying unit and the power receiving unit is an 8-bit signal having a total pulse width of 16 msec.

Further, the detecting means of the power supplying unit has any of a pair of a photoelectric light emitting device and a light sensitive device, a magnetism detecting device, a proximity sensor or the like, and the power receiving unit has any of a light reflecting portion, a permanent magnet or the like.

Further, the timer circuit has a first set time period in which electric power is transmitted and a second set time period in which transmission of electric power is stopped, the first set time period being from 0.1 second to 5 seconds and the second set time period being such a time period that the on-duty is 20% or less.

According to the non-contact electric power transmission apparatus of the present invention, when a metal piece such as a coin adheres to the supporting base of the power supplying unit main body, that is, in a state in which the power receiving unit is not placed on the supporting base in a normal state, transmission of electric power from the power supplying coil to the power receiving coil is caused to stop by the detecting means provided in the power supplying unit. Therefore the danger of heat generation can be prevented. In addition, electric power transmission is caused to stop by the recognizing means when a mounted power receiving unit is not the specified power receiving unit. Further, because of the timer circuit, restarting is possible by correction in a case of wrong operation due to slight displacement so that the practicality can be improved.

DETAILED DESCRIPTION OF THE INVENTION

An embodiment of the present invention will be described in detail with reference to FIGS. 1 to 6.

Figure 1:
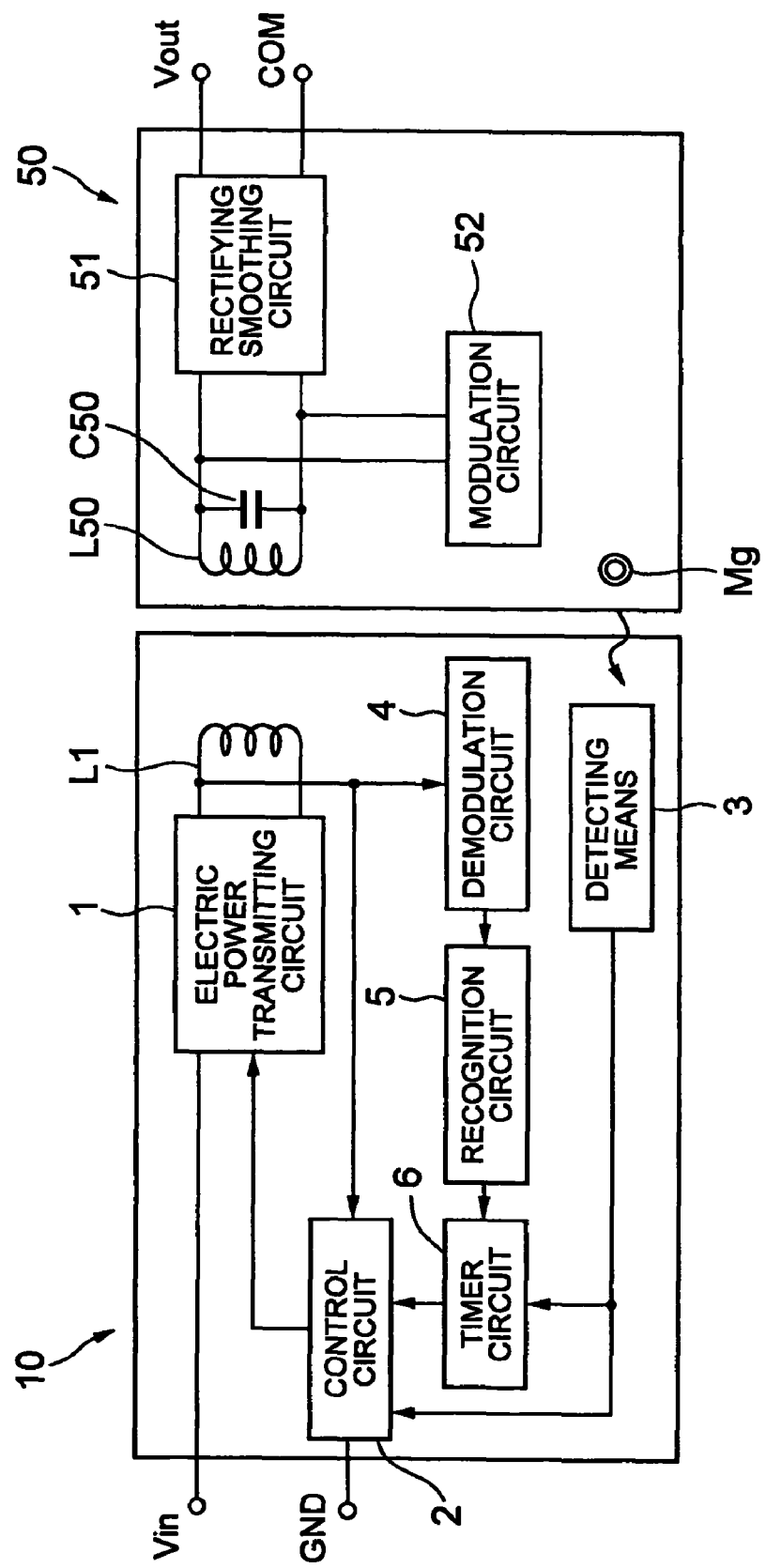
FIG. 1 is a block diagram showing an embodiment of the non-contact electric power transmission apparatus of the present invention.

FIG. 1 is a block diagram showing an embodiment of the present invention. In FIG. 1, a power supplying unit 10 is configured to have an electric power transmitting circuit 1, a power supplying coil L1 for transmitting electric power, a control circuit 2 for controlling the electric power transmitting circuit, a demodulation circuit 4 for detecting a recognition signal, a recognition circuit 5 for comparing and determining recognition signals, detecting means 3 for detecting the power receiving unit 50, and a timer circuit 6 for restarting.

A power receiving unit 50 is configured to have a power receiving coil L50, a resonant capacitor C50, a rectifying smoothing circuit 51 for rectifying and smoothing the received electric power, a modulation circuit 52 for modulating a recognition signal, and a permanent magnet Mg, which provides magnetic field to be detected by the detecting means 3, for example, a magnetic field detecting device.

In FIG. 1, the power receiving unit 50, which is a portable device, is placed on the supporting base of the main body of the power supplying unit 10. At this time, the detecting means 3 in a standby state detects the magnetic field of the permanent magnet Mg using, for example, a magnetic field detecting device, the permanent magnet Mg being installed in the position in the power receiving unit 50 facing the magnetic field detecting device. Then, the detecting means 3 applies a detection signal to the control circuit 2 to transmit electric power through the electric power transmitting circuit 1 and the power supplying coil L1 to the power receiving coil L50.

The power receiving unit 50 is set to resonate by the resonant capacitor C50 connected in parallel with the power receiving coil L50 to receive electric power efficiently. The output thereof is supplied from the rectifying smoothing circuit 51 to a secondary cell (not shown) which is the load. As electric power is received at the power receiving coil L50, a recognition signal is generated at the modulation circuit 52 and superimposed on a responsive signal to be sent out from the power receiving coil L50.

This responsive signal is shown as voltage change in the signal sent from the power receiving coil L50 to the power supplying coil L1. With respect to this voltage change, the recognition signal is demodulated from the responsive signal by the demodulation circuit 4 connected to one end of the power supplying coil L1 and is compared with a predetermined recognition signal generated by the recognition circuit 5, and only if it matches, transmission of electric power is continued.

Here, conventionally the power receiving unit 50 is detected by the detecting means 3, for example; when the recognition signal of the power receiving unit 50 is not obtained due to displacement, timing difference or the like, or when the recognition signal does not match the predetermined recognition signal, electric power transmission remains stopped.

In this regard, there is a method of controlling electric power transmission using the timer circuit 6. This is configured as follows. First, when the detecting means 3 in a standby state detects the power receiving unit 50, the timer circuit 6 performs electric power transmission for a first time period (several seconds, for example about 2 seconds) to check the recognition signal of the power receiving unit 50.

Next, when it does not match, electric power transmission is stopped for a second time period (longer than the first time period, for example about 10 seconds) using the timer circuit 6. After the second time period has elapsed, again electric power is transmitted for the first time period. The drive is continued until the predetermined recognition signal is obtained.

By using this timer circuit 6, restarting is possible by correction in a case of wrong operation due to slight displacement so that the practicality can be improved.

In addition, the electric power transmission in a predetermined time period in consideration of the time period for determination (a time period not causing heat generation=several seconds) will not lead to heat generation even if a foreign object such as a metal piece adheres.

Embodiment

Circuit diagrams of a non-contact electric power transmission apparatus which is an embodiment of the present invention will be described using FIGS. 2 to 6. FIGS. 2 to 6 are circuit diagrams of blocks into which the circuits are separated. Connections between the blocks are indicated by small letters of the alphabets (for example, a-a, b-b).

Figure 2:
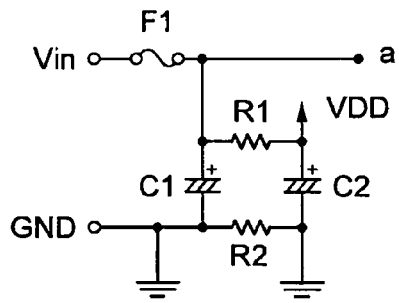
FIG. 2 is a circuit diagram showing a portion of a power supplying unit which is an embodiment of the non-contact electric power transmission apparatus of the present invention, providing the power source.

First, circuit diagrams of the power supplying unit 10 will be described. The circuit diagram of FIG. 2 shows a portion of the power supplying unit 10 providing the power source.

The power source is separated into a power system and a signal system. The power system is connected from input Vin through a fuse F1 and from an input smoothing capacitor C1 directly to switching circuits. The signal system is connected to a smoothing capacitor C2 through resistances R1, R2 so as not to be affected by noise from the power system, and is supplied to control circuits as VDD (+5V) and GND of the signal system.

Figure 3:
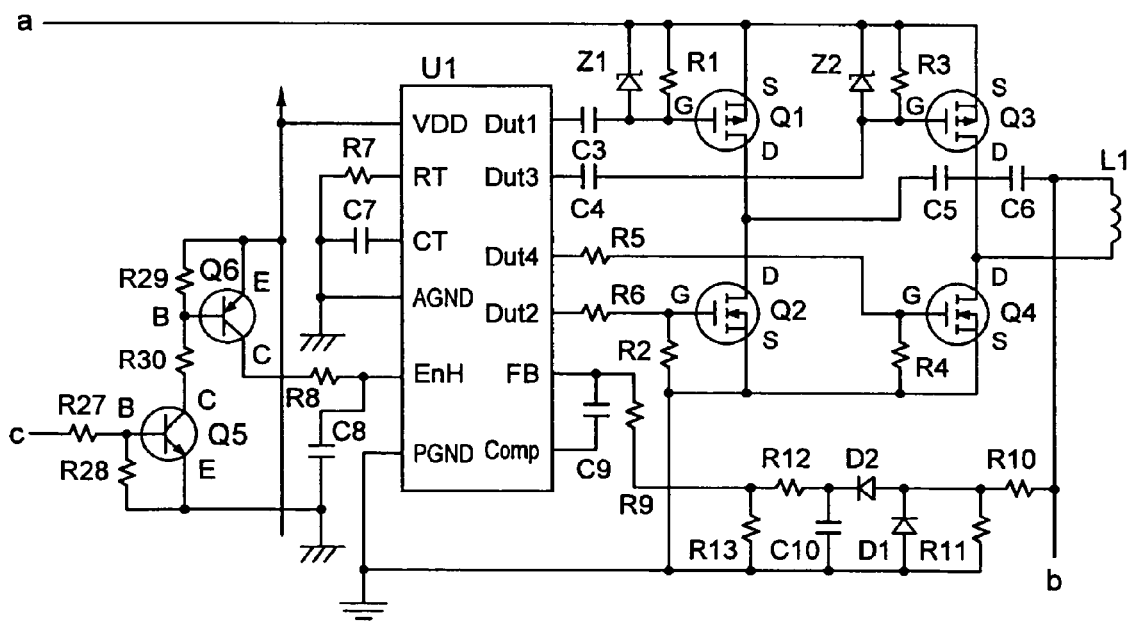
FIG. 3 is a circuit diagram showing an electric power transmitting circuit, a power supplying coil and a control circuit having on-off switches of a power supplying unit which is an embodiment of the non-contact electric power transmission apparatus of the present invention.

FIG. 3 shows the electric power transmitting circuit 1, the power supplying coil L1 and the control circuit 2 having on-off switches of the power supplying unit 10.

The electric power transmitting circuit 1 is constituted of a circuit using a full bridge circuit, and the control circuit 2 is constituted of a control IC U1 for controlling the electric power transmitting circuit 1, transistors Q5, Q6 for switching on and off the control IC U1, and a feedback circuit for constant current control.

The power source +5V of the power system is connected to the source sides of P-channel MOSFETs Q1 and Q3, and GND is connected to the source sides of N-channel MOSFETs Q2 and Q4.

The connection point of the drain side of the MOSFET Q1 and the drain side of the MOSFET Q2 is connected through resonant capacitors C5, C6 to one end of the power supplying coil L1, and the other end of the power supplying coil L1 is connected to the connection point of the drain side of the MOSFET Q3 and the drain side of the MOSFET Q4.

Next, the operation of the electric power transmitting circuit 1 will be described.

First, when the MOSFETs Q1 and Q4 are simultaneously switched on, currents flow from +5V toward GND, as Q1→C5→C6→L1→Q4. At this time, a resonant current by C5, C6 and L1 flows in the direction C→L.

Next, when the MOSFETs Q3 and Q2 are simultaneously switched on, currents flow from +V5 toward GND, as Q3→L1→C6→C5→Q2. At this time, a resonant current by C5, C6 and L1 flows in the direction L→C. Voltage generated in the power supplying coil L1 is supplied to the power receiving coil L50 by repetition of this operation.

This full bridge circuit is characterized in that: at the time of transition from the MOSFETs Q1, Q4 being on to the MOSFETs Q3 and Q2 being on, or at the time of transition from MOSFETs Q3, Q2 being on to MOSFETs Q1 and Q4 being on, a short-circuit current may flow for an instant in the MOSFETs Q1 and Q2, or Q3 and Q4; in order to prevent this, during the switching, only Q1 and Q3, or Q2 and Q4 of the MOSFETs are switched on, thereby performing regeneration of energy. This control is performed by the control IC U1 of the control circuit 2.

As for the MOSFETs Q1, Q3, connection is made from the output of the control IC U1 through capacitors C3, C4 to the gates of the MOSFETs. In order to stabilize gate levels, zener diodes Z1, Z2 and resistances R1, R3 are inserted between the gate and source of the MOSFETs.

As for the MOSFETs Q2, Q4, connection is made through gate resistances R5, R6 to the gates of the MOSFETs. In order to stabilize gate levels, resistances R3, R4 are respectively inserted between the gate and source.

The oscillating frequency is determined by the reference voltage in the control IC U1 and the time constant of a resistance R7 and a capacitor C7.

For constant current control, the voltage waveform is extracted from the connection point of the capacitor C6 and the power supplying coil L1, rectified by a diode D2 after voltage division by resistances R10 and R11, smoothed by a smoothing capacitor C10, further divided by resistances R12 and R13, and applied to a FB terminal (current feedback terminal) of the control IC U1 through a resistance R9.

Figure 4:
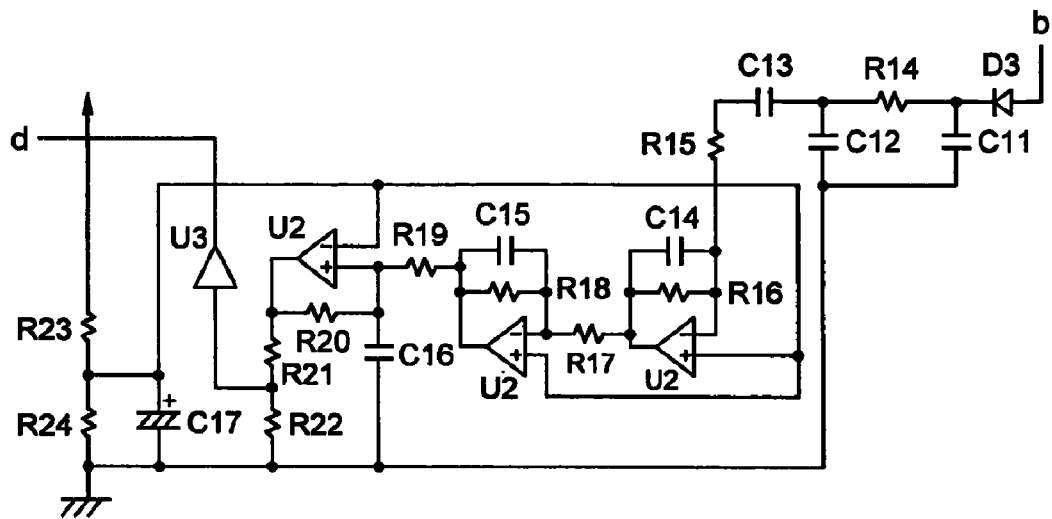
FIG. 4 is a circuit diagram showing a demodulation circuit 4 of a power supplying unit which is an embodiment of the non-contact electric power transmission apparatus of the present invention.

FIG. 4 is a circuit diagram showing the demodulation circuit 4. The demodulation circuit 4 is configured to have a diode D3 connected to one end of the power supplying coil L1, a filter circuit (C11, R14, C12, C13, R15), an operational amplifier U2 and a logic non-inverter U3.

The recognition signal, which is a responsive signal from the power receiving unit 50 described with FIG. 6 below, is rectified by the diode D3 connected to one end of the power supplying coil L1 and thereafter its waveform is shaped by the filter circuit (C11, R14, C12, C13, R15) and the operational amplifier U2, and the recognition signal is demodulated by the demodulation circuit 4 The recognition signal demodulated by the demodulation circuit 4 is finally shaped through the logic non-inverter U3 (into the same waveform as the output of a microcomputer U50 of the power receiving unit 50), and is applied to a microcomputer U4 of the recognition circuit 5 in FIG. 5 described below.

Figure 5:
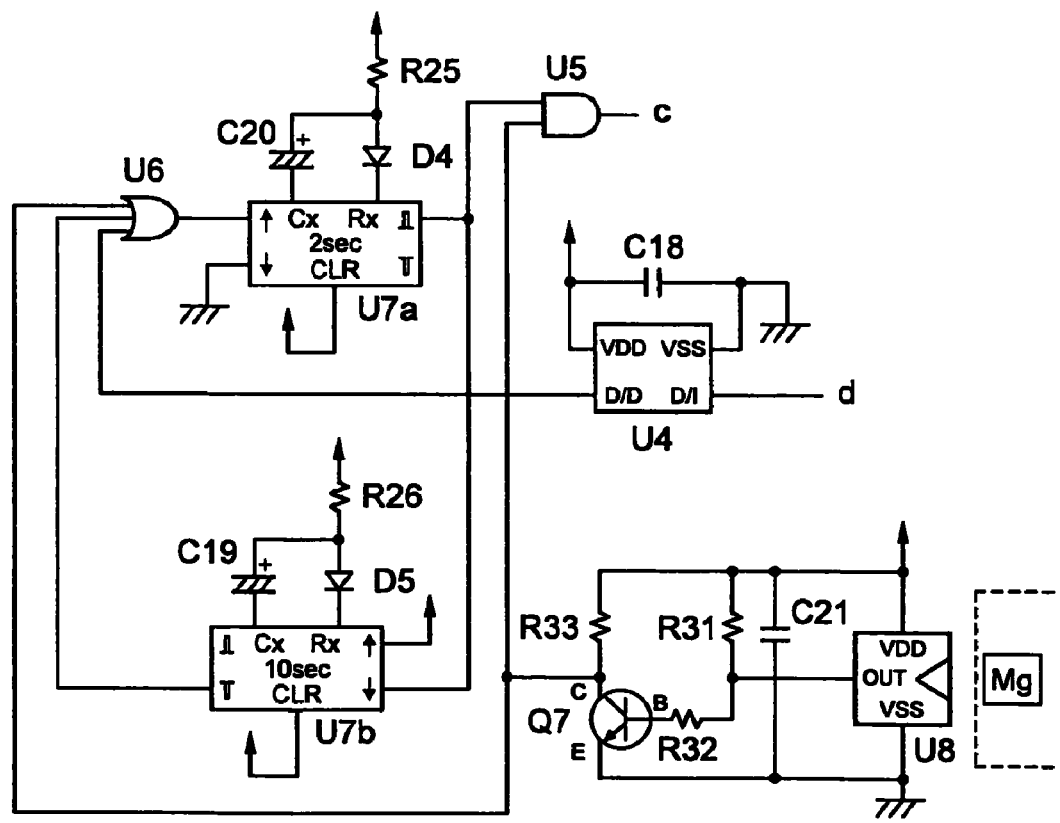
FIG. 5 is a circuit diagram showing detecting means, a timer circuit and a recognition circuit of a power supplying unit which is an embodiment of the non-contact electric power transmission apparatus of the present invention.

FIG. 5 is a circuit diagram showing the detecting means 3, the timer circuit 6 and the recognition circuit 5. The detecting means 3 is described with respect to an example in which a Hall IC U8, which is a magnetic field detecting device, and a permanent magnet Mg are used. The timer circuit 6 is constituted of multivibrator ICs U7a, U7b, a three-input OR circuit U6 and a two-input AND circuit U5. The recognition circuit 5 is constituted by a microcomputer U4.

In the detecting means 3 and the timer circuit 6, when the permanent magnet Mg attached to the housing of the power receiving unit 50 approaches the Hall IC U8 of the power supplying unit 10, the Hall IC U8 operates and the collector voltage of a transistor Q7 changes from L level to H level.

This signal output is input to one gate of the three-input OR circuit U6 and the output thereof is input to a rising edge trigger terminal of the multivibrator IC U7a. The multivibrator IC U7a generates a pulse of 2 sec, which is the first set time period, according to the time constant of a resistance R25 and a capacitor C20 which are external.

This signal is input to one terminal of the two-input AND circuit U5, and to the other terminal is applied the collector voltage of the transistor Q7. For example, when the power receiving unit is placed on the supporting base, the Hall IC U8 and the transistor Q7 have H level signals so that the output of the AND circuit U5 outputs an H level signal.

When this signal is applied to the transistor Q5 through resistance R27 of the control circuit 2 in FIG. 3, the transistor Q5 is switched on and the transistor Q6 is switched on through resistance R30. When the transistor Q6 is switched on, the signal system power source +5V is applied to an EnH terminal of the control IC U1 through a resistance R8, and the electric power transmitting circuit 1 starts to transmit electric power from the power supplying coil L1 to the power receiving coil L50.

The recognition signal demodulated (into the same waveform as the output of the microcomputer U50 of the power receiving unit 50) by the demodulation circuit 4 (FIG. 4) is applied to the microcomputer U4 of the recognition circuit 5.

This recognition signal is compared with an 8-bit signal (a total pulse width of 16 msec) generated by the microcomputer U4, and only if it matches, the microcomputer U4 outputs an H level pulse signal. This output of the microcomputer U4 passes through the OR gate circuit U6, and the output thereof is input to the rising edge trigger terminal of the multivibrator U7a.

In the present embodiment, for example the first set time period of the multivibrator U7a is a pulse width of 2 seconds; if a retriggering signal is input before this time period is up, the multivibrator U7a does not have the time period up and still retains H level so that the timer of 2 seconds is actuated again to continue transmission of electric power.

The later-described recognition signal from the power receiving unit 50 is to be generated for a total pulse width of 16 msec at an interval of 1 second so that a retriggering signal is input before the 2-second timer has the time period up. Therefore, electric power is transmitted continuously as long as the recognition signal is provided.

Next, restarting operation using the timer circuit 6 will be described.

First, when the power receiving unit 50 (in the embodiment, the permanent magnet Mg) moves away from the supporting base, the output voltage of the detecting circuit 3 (Hall IC output, transistor Q7) is changed from H level to L level, the output of the AND circuit U5 also becomes L level, and the control IC U1 in FIG. 3 stops electric power transmission.

To restart, electric power transmission is started in the same mode as before by resetting the power receiving unit 50 on the supporting base.

Next, the case where the recognition signal of the power receiving unit 50 is not returned to the power supplying unit 10 through the power receiving coil L50, or where the returned signal is different from the recognition signal, will be described.

In the present embodiment, the first set time period of the multivibrator U7a is 2 seconds, and the second set time period of the multivibrator U7b is 10 seconds.

When the recognition signal of the power receiving unit 50 is not returned to the power supplying unit 10 through the power receiving coil L50, or when the returned signal is different from the recognition signal, the multivibrator U7a has the first set time period (2 seconds) up, so that the output pulse changes from H level to L level.

This L level output pulse is detected by the other multivibrator U7b and the second set time period (10 seconds) is actuated. L level to switch off electric power transmission is output during this set time period of the timer of the multivibrator U7b.

Here, the off-time period of the timer of the multivibrator U7b is the second set time period. In the present embodiment, this second set time period is 10 seconds, during which electric power transmission is stopped. After the 10 seconds of the second set time period have elapsed, the multivibrator U7b undergoes rising change from L level to H level. This signal is input to the multivibrator U7a through the OR circuit U6, whereupon the timer of 2 seconds, which is the first set time period, is again actuated, and the output of the AND gate U5 is H level only during that H level set time period so that electric power transmission is started.

Electric power is transmitted for the first set time period (2 seconds), and when the time period is up, again the second set time period (10 seconds) operates to stop electric power transmission. This operation is repeated.

Thus, by means of electric power transmission of the cycle of being on for the first set time period (2 seconds) and being off for the second set time period (10 seconds), abnormal heat generation does not occur when a foreign object is placed on the supporting base. In addition, electric power transmission is again started to restart if the recognition signal is recognized during the electric power transmission period of the cycle of being on for the first set time period (2 seconds) and being off for the second set time period (10 seconds).

Although logic circuits are used for the configuration in order to facilitate understanding of operation of the power supplying side, this sequence may be formed of circuits incorporated in microcomputers.

Figure 6:
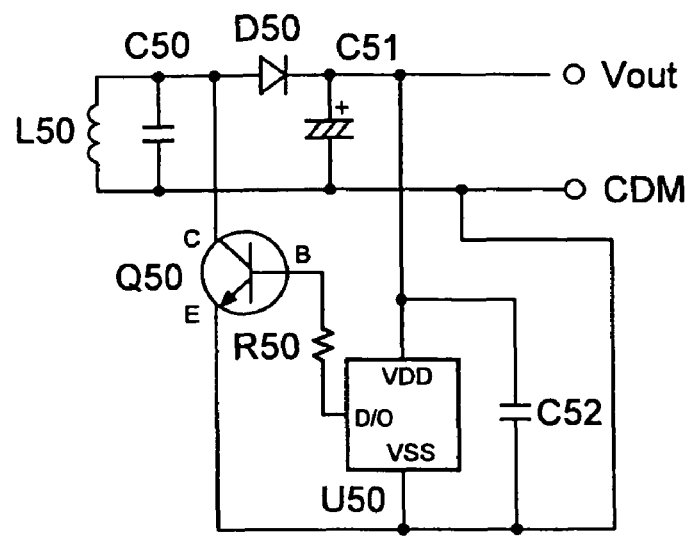
FIG. 6 is a circuit diagram showing a power receiving unit which is an embodiment of the non-contact electric power transmission apparatus of the present invention.
Figure 7:
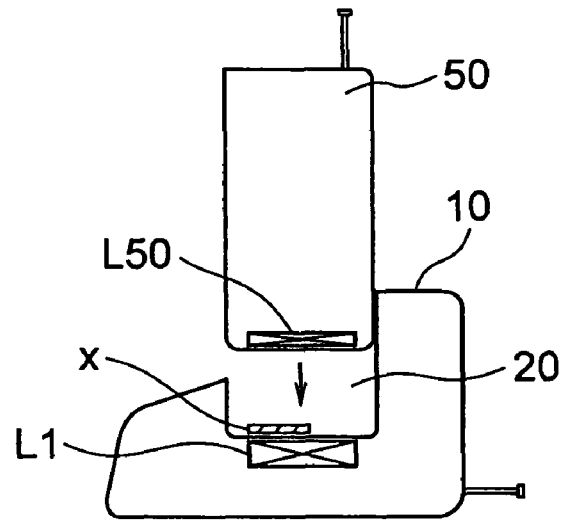
FIG. 7 is a view of the configuration of the power supplying unit and the power receiving unit of a non-contact electric power transmission apparatus.

FIG. 6 shows the circuit of the power receiving unit 50. The power receiving unit 50 has a power receiving coil L50, a resonant capacitor C50, a rectifying smoothing circuit 51, a modulation circuit 52 and a detected device Mg for the detecting means.

The power receiving unit 50 receives electric power efficiently by the resonance of the power receiving coil L50 and the resonant capacitor C50, and the voltage thereof is rectified and smoothed by a diode D50 and a capacitor C51, which are the rectifying and smoothing circuit 51. At this time, upon generation of voltage in the power receiving coil L50, a microcomputer U50 of the modulation circuit 52 connected to the output side Vout starts to operate.

When voltage is applied to the microcomputer U50, it starts to operate and generates a set 8-bit responsive signal (a total pulse width of 16 msec) at an interval of 1 second. This signal is applied to a transistor Q50 connected to both ends of the power receiving coil L50 through a resistance R50 to switch on and off the transistor Q50 to superimpose the responsive signal (this operation is called modulation); this is a modulation circuit.

This responsive signal is transmitted to the power supplying coil L1 of the power supplying unit 10 through the power receiving coil L50.

Next, the cycle of the first set time period to transmit electric power and the second set time period to stop electric power transmission in the power supplying unit 10 will be described in detail.

<About the First Set Time Period>

About 50 msec is required for the time period "A+B+C", wherein "A" is the time period from when a detection signal is obtained from the detecting means 3 until the electric power transmitting circuit 1 operates, electric power is transmitted from the power supplying coil L1 through the power receiving coil L50, and the modulation circuit 52 reaches a predetermined voltage; "B" is the time period of the cycle of the pulse signal sequence of the recognition signal of the modulation circuit 52; "C" is the time period from the modulation circuit 52 through the power receiving coil L50, power supplying coil L1 via the demodulation circuit 4 until determination is made at the recognition circuit 5. Therefore, the minimum first electric power transmission time period is desirably 0.1 second.

Meanwhile, when a foreign object such as a metal is placed, the heat generation does not raise the temperature to an abnormal level in about 5 seconds; considering this, the maximum first electric power transmission time period is desirably about 5 seconds.

<About the Second Set Time Period>

Heat generated by electric power transmission during the first set time period is cooled down to near the former temperature by a sufficiently long period of stop. Considering this and assuming the condition for not exceeding the safe temperature, that is, the amount of rise of temperature to be 20° C., the on-duty is determined to be desirably 20% or less.

If the on-time period is short, for example 0.1 second, the off-time period is 0.5 second or more so as to provide a proper ratio. If the on-time period is long, for example 5 seconds, the off-time period is such a time period as to provide a proper ratio: 25 seconds or more. Thus, the on-duty is desirably 20% or less.

As described above, according to the present invention, when a metal piece such as a coin adheres to the supporting base of the power supplying unit main body, that is, in a state in which the power receiving unit is not placed on the supporting base in a normal state, transmission of electric power from the power supplying coil to the power receiving coil is caused to stop by detecting means provided in the power supplying unit. Therefore the danger of heat generation can be prevented.

In addition, electric power transmission is caused to stop by recognizing means when a mounted power receiving unit is not the specified power receiving unit.

Further, because of the timer circuit, restarting is possible by correction in a case of wrong operation due to slight displacement so that the practicality can be improved.

Thus, in the detecting means, the electric power is weak as required for driving of the magnetic field detecting device, proximity sensor or the like so that it is economical as well as heat generation or the like does not need to be considered.

Further, in the power receiving unit side, reduction of weight of the power receiving unit is possible since a small and light permanent magnet, reflecting plate or the like is used.

In addition, although the electric power transmitting circuit is described as a full bridge circuit in the above description, it may also be a half bridge circuit and other electric power transmitting circuits may also be used.

Further, although the recognition signal is described as a recognition signal of the power receiving unit, it may also be a recognition signal including information about power reception of the secondary cell.

Further, as the magnetic field detecting device, a Hall IC or a proximity sensor may also be used, and further an optical sensor using reflection of light, a combination of an infrared LED and a phototransistor, RFID or the like may also be used.

What is claimed is:

1. A non-contact electric power transmission apparatus having: a power supplying unit main body containing a power supplying coil for non-contact electric power transmission; a power receiving unit containing a power receiving coil for non-contact electric power transmission; and a supporting base for detachably mounting the power receiving unit, formed in a portion of the power supplying unit main body, the apparatus transmitting electric power from the power supplying coil to the power receiving coil in a non-contact manner using electromagnetic induction, wherein:

the power receiving unit has a modulation circuit which outputs a recognition signal upon receiving electric power from the power supplying coil at the power receiving coil;

the power supplying unit has detecting means, a demodulation circuit, a recognition circuit, and a timer circuit;

the detecting means detects that the power receiving unit is placed on the supporting base of the power supplying unit to start electric power transmission from the power supplying coil, the recognition signal from the modulation circuit being detected as voltage change in the power supplying coil;

the demodulation circuit demodulates the recognition signal to check whether or not it is a predetermined recognition signal, and if it is not the predetermined recognition signal, an output signal is applied to the timer circuit; and the timer circuit stops electric power transmission for a predetermined time period and thereafter restarts by checking again.

2. The non-contact electric power transmission apparatus according to claim 1, wherein the modulation circuit of the power receiving unit generates a recognition signal upon receiving electric power from the power supplying coil at the power receiving coil, modulates the recognition signal, and outputs the recognition signal from the power receiving coil to the power supplying coil.

3. The non-contact electric power transmission apparatus according to claim 1, wherein the detecting means of the power supplying unit has any of a pair of a photoelectric light emitting device and a light sensitive device, a magnetism detecting device, a proximity sensor or the like, and the power receiving unit has any of a light reflecting portion, a permanent magnet or the like.

4. The non-contact electric power transmission apparatus according to claim 1, wherein the recognition signal is an 8-bit signal having a total pulse width of 16 msec.

5. The non-contact electric power transmission apparatus according to claim 1, wherein the timer circuit has a first set time period in which electric power is transmitted and a second set time period in which transmission of electric power is stopped, the first set time period being from 0.1 second to 5 seconds and the second set time period being such a time period that on-duty is 20% or less.

* * * * *